United States Patent
Chang et al.

(10) Patent No.: US 11,760,311 B1
(45) Date of Patent: Sep. 19, 2023

(54) ASSEMBLING STRUCTURE OF WIPER ACCESSORY SEAT

(71) Applicant: DANYANG UPC AUTO PARTS CO., LTD., Jiangsu (CN)

(72) Inventors: Che-Wei Chang, Jiangsu (CN); Cheng-Kai Yang, Jiangsu (CN); Chuan-Chih Chang, Jiangsu (CN)

(73) Assignee: DANYANG UPC AUTO PARTS CO., LTD., Jiangsu (CN)

( * ) Notice: Subject to any disclaimer, the term of this patent is extended or adjusted under 35 U.S.C. 154(b) by 0 days.

(21) Appl. No.: 17/987,851

(22) Filed: Nov. 15, 2022

(30) Foreign Application Priority Data

Mar. 14, 2022 (CN) .......................... 202210244789.X

(51) Int. Cl.
B60S 1/38 (2006.01)

(52) U.S. Cl.
CPC ............... B60S 1/38 (2013.01); B60S 1/3849 (2013.01); B60S 1/3851 (2013.01); B60S 1/3853 (2013.01); B60S 1/3858 (2013.01); B60S 1/3879 (2013.01)

(58) Field of Classification Search
CPC .... B60S 1/3849; B60S 1/3858; B60S 1/3853; B60S 1/3851; B60S 1/3879; B60S 1/3875
USPC ......................... 15/250.32, 250.43
See application file for complete search history.

(56) References Cited

U.S. PATENT DOCUMENTS

| 7,263,741 | B2 * | 9/2007 | Genet | B60S 1/40 |
| | | | | 15/250.43 |
| 7,587,783 | B1 * | 9/2009 | Lin | B60S 1/3879 |
| | | | | 15/250.43 |
| 2018/0037196 | A1 * | 2/2018 | Yee | B60S 1/3431 |

FOREIGN PATENT DOCUMENTS

| DE | 102008042839 | * | 4/2010 |
| DE | 102011007248 | * | 10/2012 |
| DE | 102016113675 | * | 1/2018 |

* cited by examiner

*Primary Examiner* — Gary K. Graham
(74) *Attorney, Agent, or Firm* — Chun-Ming Shih; HDLS IPR SERVICES

(57) ABSTRACT

An assembling structure of wiper accessory seat includes an accessory seat and metal elastic sheets. The bottom portion of the accessory seat is formed with a recess, first fixing portions and second fixing portions. The first fixing portions and the second fixing portions are symmetrically disposed on two opposite sides of the recess and arranged spacedly in an upper-bottom manner. The metal elastic sheets are disposed with third fixing portions, separately inserted between the first fixing portions and the second fixing portions, and connected to the bottom portion of the accessory seat by the third fixing portions being positioned on the first fixing portions and the second fixing portions being positioned on the metal elastic sheets so as to simplify the assembling structure.

9 Claims, 8 Drawing Sheets

ASSEMBLING STRUCTURE OF WIPER ACCESSORY SEAT

BACKGROUND

Technical Field

The disclosure relates to a wiper structure, particularly to an assembling structure of a wiper accessory seat.

Description of Related Art

A vehicle wiper is disposed outside the glass and connected to a wiper driving arm. The wiper is driven by the wiper driving arm to swing over the glass to exert an action force on a blade to remove rain or dirt on the glass.

Further, a vehicle wiper is structured by connecting a wiper driving arm to an accessory seat and connecting the bottom of the accessory seat with a metal elastic sheet and a blade. Therefore, the wiper driving arm drives the accessory seat and presses the metal elastic sheet and the blade to clean a vehicle's glass. Also, the accessory seat and the metal elastic sheet of the abovementioned wiper structure are connected by riveting. However, the connection by riveting is complicated and time-consuming and causes increasing cost. In addition, the accessory seat or the metal elastic sheet is easily to be deformed during the riveting to result in a poor outward size or even a bad cleaning function. Thus, it is a problem to be solved.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

The disclosure provides an assembling structure of wiper accessory seat so as to accomplish an object of simplifying the assembling manner of an accessory seat and a metal elastic sheet to improve the assembling convenience.

To accomplish the above object, the disclosure provides an assembling structure of wiper accessory seat, which includes an accessory seat and a pair of metal elastic sheets. The accessory seat includes a top portion and a bottom portion. The top portion is used to connect with an end of a driving arm. The bottom portion is formed with a recess, multiple first fixing portions and multiple second fixing portions. The first fixing portions and the second fixing portions are located in the recess. The first fixing portions and the second fixing portions are symmetrically disposed on two opposite sides of the recess and arranged spacedly in an upper-bottom manner. The metal elastic sheets are separately corresponding to the first fixing portions to be disposed with multiple third fixing portions and are separately inserted between the first fixing portions and the second fixing portions on two sides of the bottom portion. The metal elastic sheets are connected to the bottom portion of the accessory seat by the third fixing portion being positioned on the first fixing portion and the second fixing portion being positioned on the metal elastic sheet.

In comparison with the related art, the bottom of the accessory seat of the disclosure is formed with a recess, multiple first fixing portions and multiple second fixing portions. The first fixing portions and the second fixing portions are located in the recess and the first fixing portions and the second fixing portions are arranged spacedly in an upper-bottom manner. In addition, the metal elastic sheet is corresponding to the first fixing portions to be disposed with third fixing portions so as to make the metal elastic sheet be connected to the bottom portion of the accessory seat by the third fixing portion being positioned on the first fixing portion and the second fixing portion being positioned on the metal elastic sheet. Therefore, the complicated process of the riveting used between a related-art metal accessory seat and a metal elastic sheet to serve as a connection is replaced. Thus, the object of the disclosure by using abovementioned simple assembling manner to connect the metal elastic sheets to the bottom portion of the accessory seat is accomplished.

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive.

Figure 1:
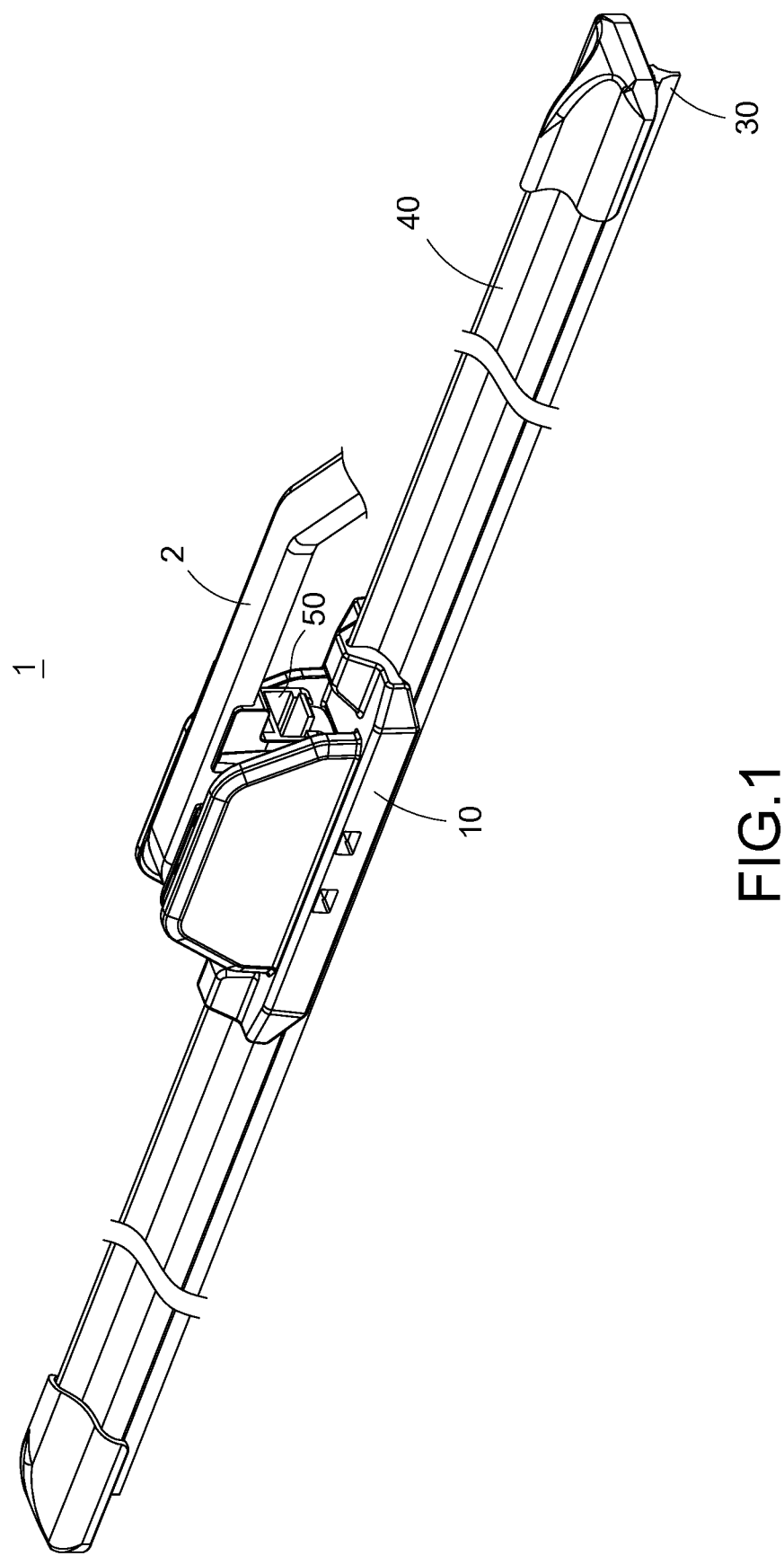
FIG. 1 is a perspective schematic view of the wiper set of the disclosure.
Figure 2:
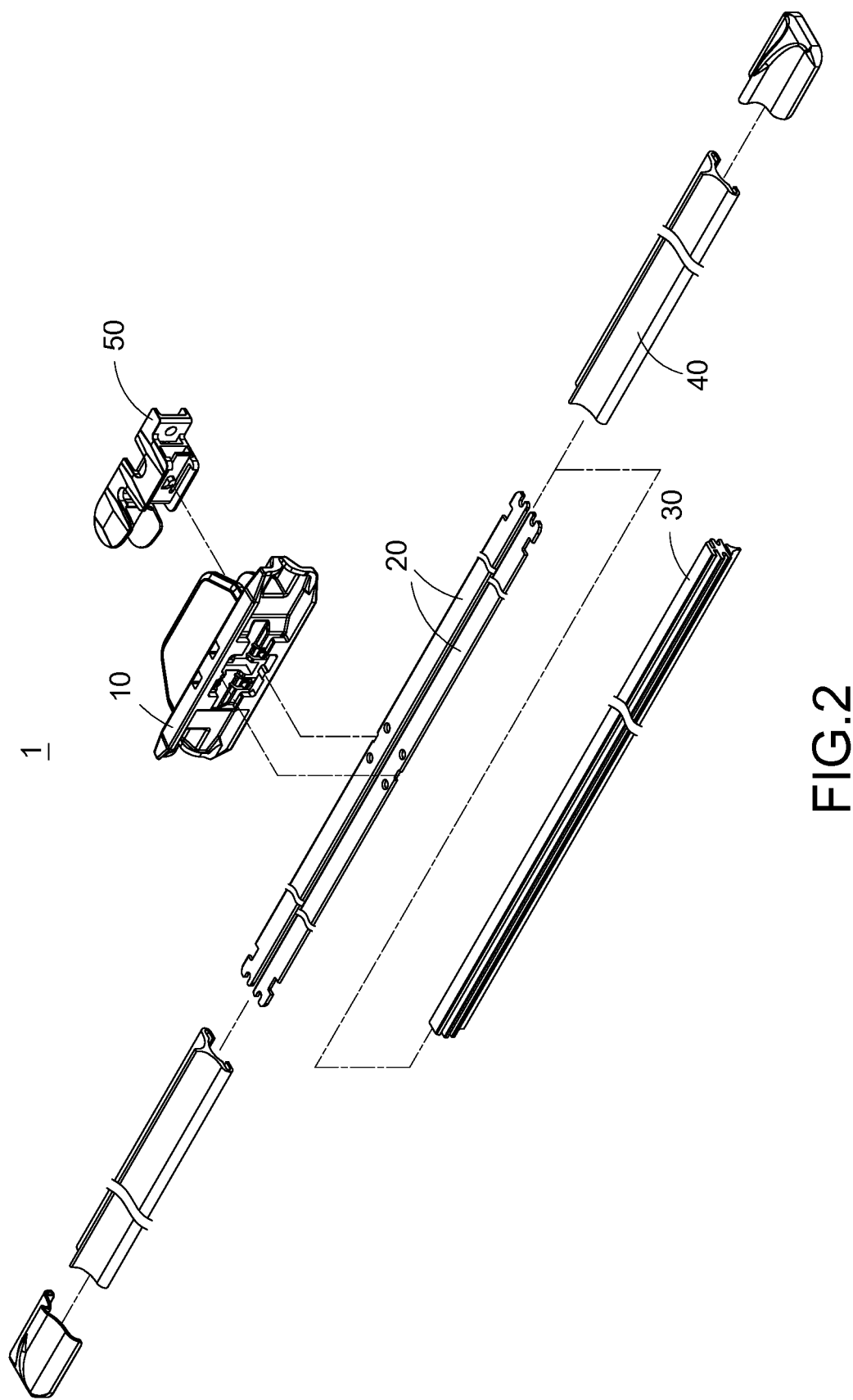
FIG. 2 is an exploded schematic view of the wiper set of the disclosure.

Please refer to FIGS. 1 and 2, which show a perspective schematic view and an exploded schematic view of the wiper set of the disclosure. The disclosure provides a wiper set 1, which includes an accessory seat 10, a pair of metal elastic sheets 20 and a blade 30. Also, the assembling structure of the accessory seat 10 is used to connect the pair of metal elastic sheets to the bottom portion of the accessory seat 10 and insert the blade 30 between the pair of metal elastic sheets 20. Also, the wiper set 1 further includes a shroud 40 and a cover 50. The shroud 40 is penetrated by the pair of metal elastic sheets 20 and covers the blade 30. The cover 50 is connected on the accessory seat 10 and pivots a driving arm 2 on the accessory seat 10 to constitute the wiper set 1. The disclosure further describes the assembling structure of the accessory seat 10 of the wiper set 1 as follows.

Figure 3:
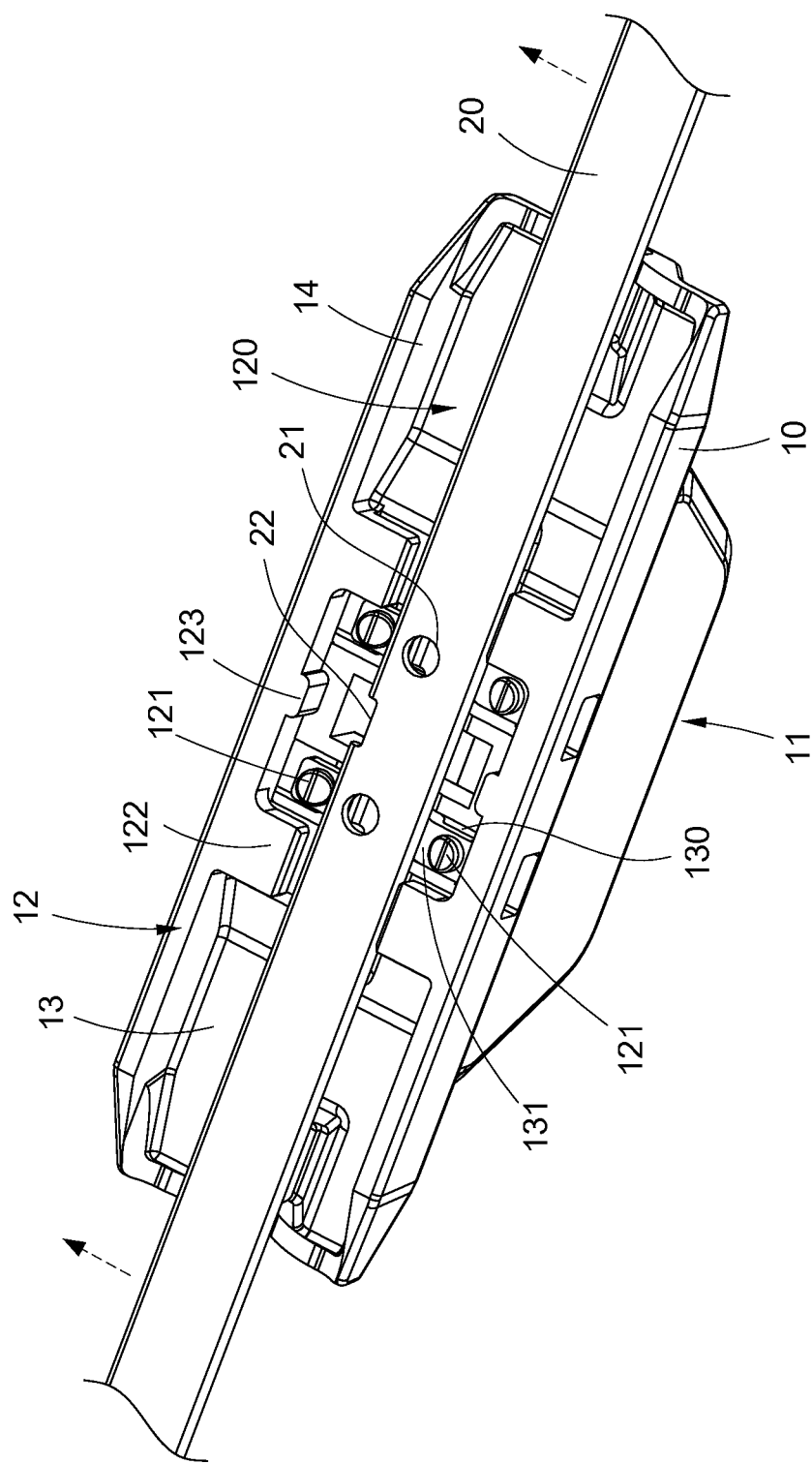
FIGS. 3-5 are assembled schematic views of the accessory seat and the metal elastic sheet of the disclosure.
Figure 4:
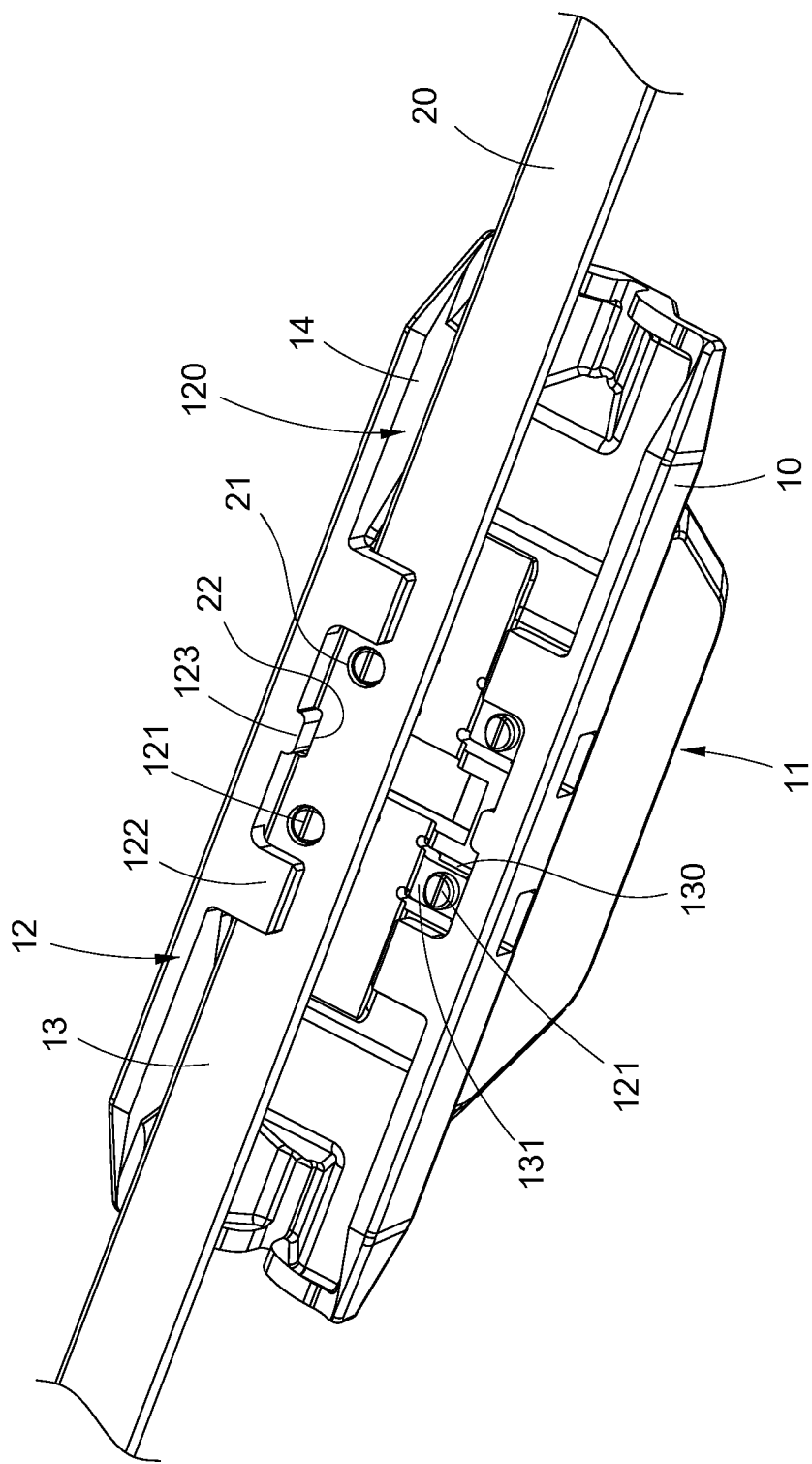
Figure 5:
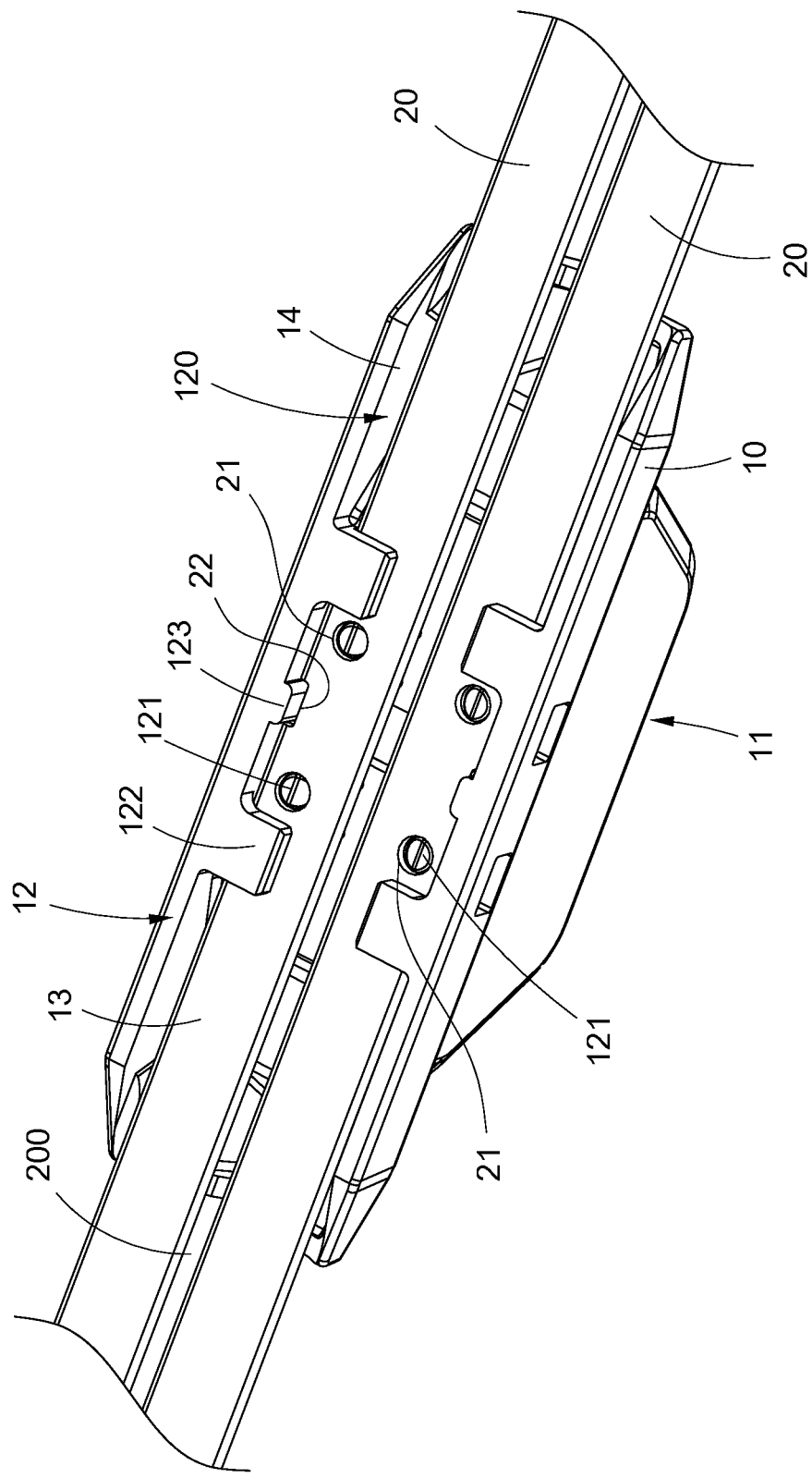

Please refer to FIGS. 3-5, which show assembled schematic views of the accessory seat and the metal elastic sheet of the disclosure. As shown in figures, the accessory seat 10 includes a top portion 11 and a bottom portion 12 opposite to each other. The top portion 11 may be used to be connected with an end of the driving arm 2. The bottom portion 12 is formed with a recess 120, multiple first fixing portions 121 and multiple second fixing portions 122. The first fixing portions 121 and the second fixing portions 122 are located in the recess 120 and on two inner edges of opposite sides of the recess 120.

Also, the first fixing portions 121 and the second fixing portions 122 are symmetrically disposed on two opposite sides of the recess 120, and each first fixing portions 121 and each second fixing portion 122 are arranged spacedly in an upper-bottom manner.

In detail, the accessory seat 10 is a plastic seat, and includes a bottom plate 13 formed with the recess 120 and two side plates 14 upright disposed on opposite sides of the bottom plate 13. The bottom plate 13 is disposed with multiple hollows 130 and multiple support arms 131 formed between the hollows 130. The first fixing portions 121 are separately located on the support arms 131. In addition, a step and the recess 120 are formed between the bottoms of the two side plates 14 and the bottom plate 13.

Furthermore, the pair of metal elastic sheets 20 are separately corresponding to the first fixing portions 121 to be disposed with multiple third fixing portions 21. the pair of metal elastic sheets 20 are separately inserted between the first fixing portions 121 and the second fixing portions 122 on two sides of the bottom portion 12. The pair of metal elastic sheets 20 are connected to the bottom portion 12 of the accessory seat 10 by the third fixing portions 21 being positioned on the first fixing portions 121 and the second fixing portions 122 being positioned on the pair of metal elastic sheets 20.

In more detail, each second fixing portion 122 is extended from a side of each side plate 14 toward the middle direction of the recess 120. Also, each first fixing portion 121 is disposed as a protrusive bar, each second fixing portion 122 is disposed as a protrusive sheet, and each third fixing portion 21 is disposed as an opening.

In an embodiment of the disclosure, the bottom portion 12 is formed with multiple first positioning portions 123, the first positioning portions 123 are separately located between the second fixing portions 122 on a side of the recess 120. Also, each metal elastic sheet 20 is corresponding to each first fixing portions 121 to be disposed with a second positioning portion 22. Each second positioning portion 22 is engaged with each first positioning portion 123. In detail, each first positioning portion 123 is disposed as a protrusive block and each second positioning portion 22 is an engaging slot.

When assembling the pair of metal elastic sheets 20, first, a side of one of the metal elastic sheets 20 is pushed into between the first fixing portion 121 and the second fixing portion 122, and the third fixing portion 21 (opening) of the metal elastic sheet 20 is positioned on the first fixing portions (121) (protrusive bars). At the same time, the second fixing portions 122 (protrusive sheets) press and are positioned on the pair of metal elastic sheets 20 to make the metal elastic sheet 20 be connected on a side of the bottom portion 12 of the accessory seat 10.

Also, the other metal elastic sheet 20 is connected on the other side of the bottom portion 12 of the accessory seat 10 in the same manner as mentioned above. As a result, the pair of metal elastic sheets 20 may be firmly connected on the bottom portion 12 of the accessory seat 10. It should be noted that a gap 200 is formed between the pair of metal elastic sheets 20 after the pair of metal elastic sheets 20 are assembled in the bottom portion 12 of the accessory seat 10.

Figure 6:
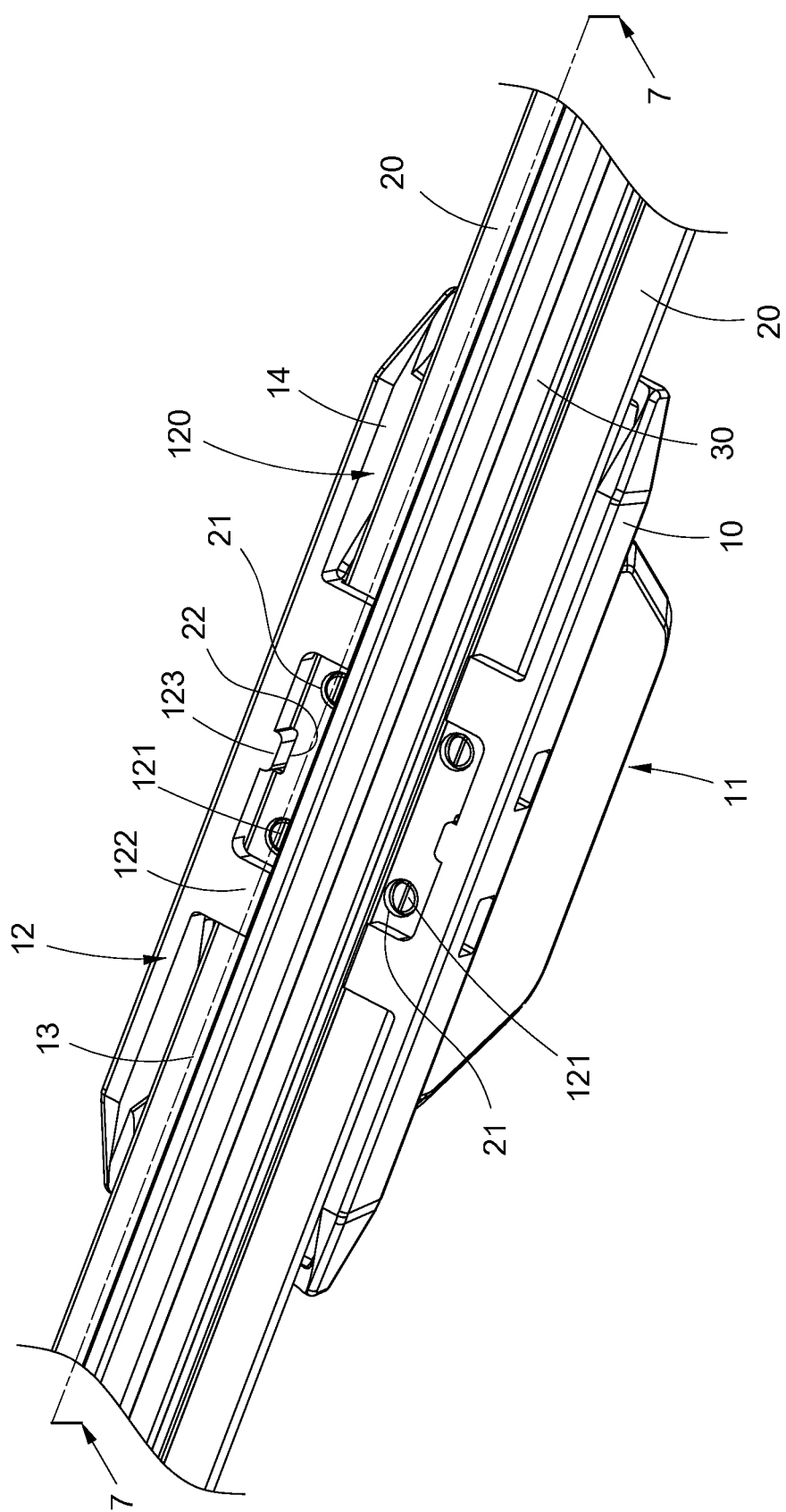
FIG. 6 is an assembled schematic view of the blade and the metal elastic sheet of the disclosure.
Figure 7:
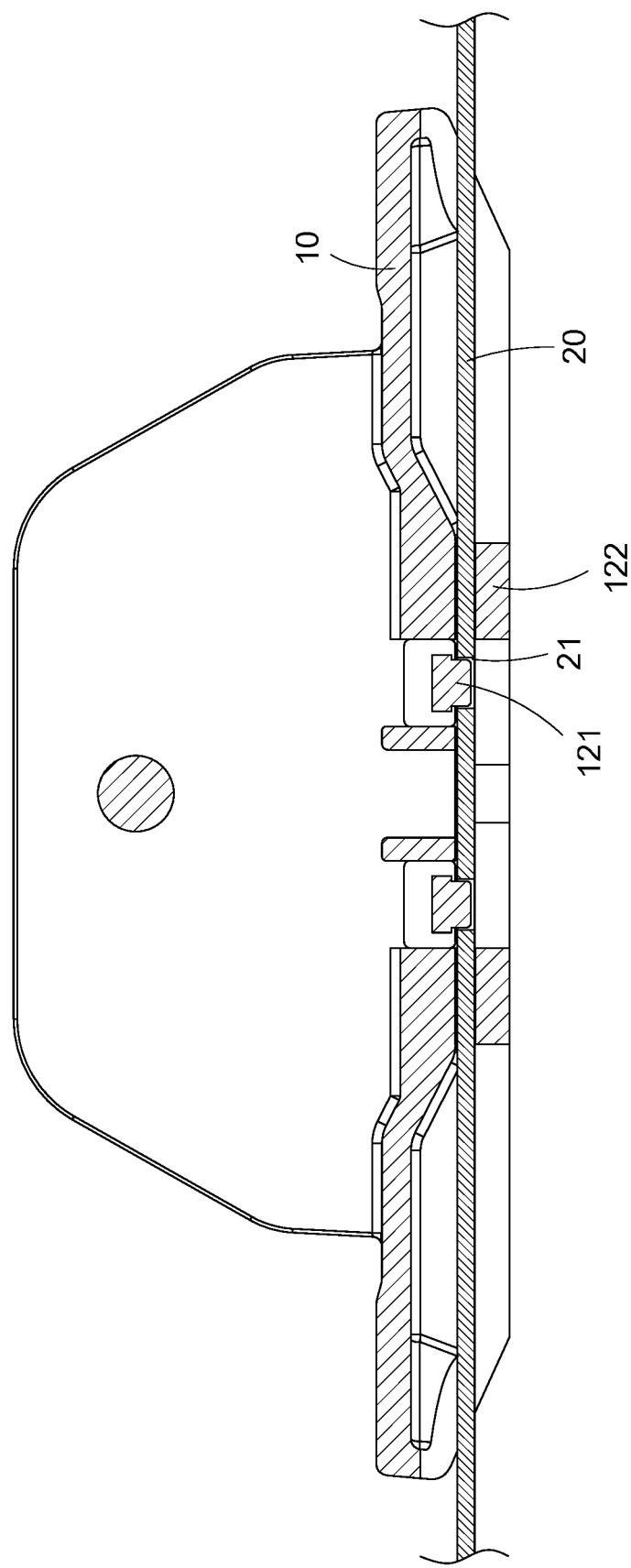
FIGS. 7 and 8 are assembled cross-sectional views of the accessory seat, the metal elastic sheet and the blade of the disclosure.
Figure 8:
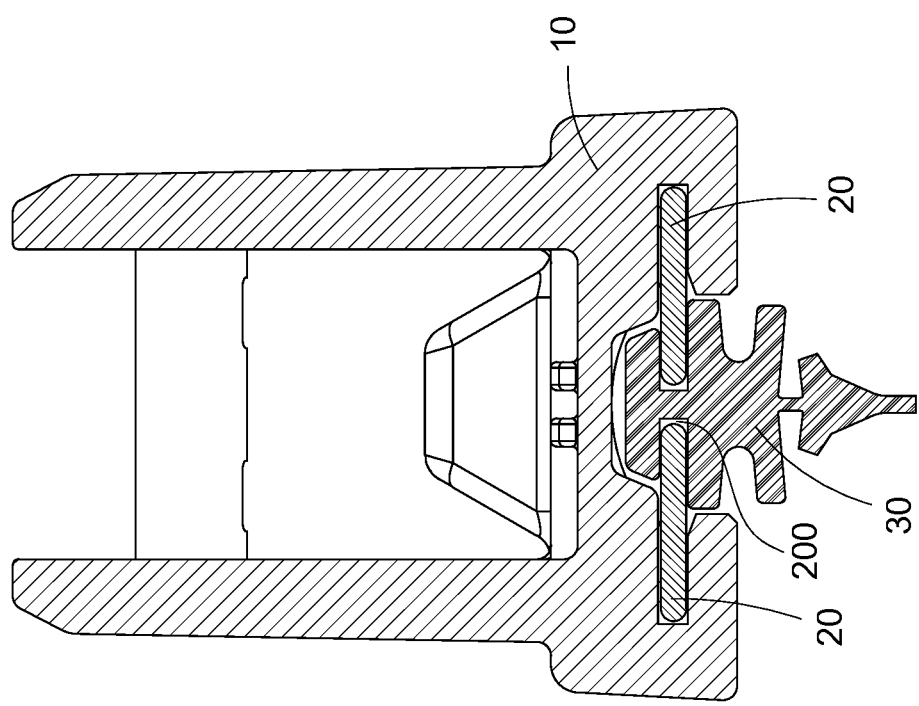

Please refer to FIGS. 6-8, which show an assembled schematic view of the blade and the metal elastic sheet of the disclosure and assembled cross-sectional views of the accessory seat, the metal elastic sheet and the blade of the disclosure. The pair of metal elastic sheets 20 are separately inserted between the first fixing portion 121 and the second fixing portion 122 on two sides of the bottom portion 12. After the pair of metal elastic sheets 20 are assembled in the bottom portion 12 of the accessory seat 10, the blade 30 is made to penetrate in the gap 200 from an end of the pair of metal elastic sheets 20. As a result, the pair of metal elastic sheets 20 and the blade 30 are connected to the bottom portion 12 of the accessory seat 10 by a simple assembling manner.

While this disclosure has been described by means of specific embodiments, numerous modifications and variations could be made thereto by those skilled in the art without departing from the scope and spirit of this disclosure set forth in the claims.

What is claimed is:

1. An assembling structure of a wiper accessory seat, the assembling structure comprising:
    an accessory seat, comprising a top portion and a bottom portion opposite to each other, the top portion connected with an end of a driving arm, the bottom portion comprising a recess, multiple first fixing portions and multiple second fixing portions, and the first fixing portions and the second fixing portions symmetrically disposed on two sides of the recess and arranged spacedly in an upper-bottom manner; and
    a pair of metal elastic sheets, respectively comprising multiple third fixing portions corresponding to the first fixing portions, separately inserted between the first fixing portions and the second fixing portions on two sides of the bottom portion, and connected to the bottom portion of the accessory seat by the third fixing portions being positioned on the first fixing portions and the second fixing portions being positioned on the pair of metal elastic sheets;
    wherein the accessory seat is a plastic seat, the plastic seat comprises a bottom plate with the recess, the bottom plate comprises multiple hollows and multiple support arms disposed between the hollows, and the first fixing portions are separately located on the support arms.

2. The assembling structure claim 1, wherein the accessory seat comprises two side plates upright disposed on two sides of the bottom plate, and a step and the recess are disposed between bottoms of the two side plates and the bottom plate.

3. The assembling structure of claim 2, wherein each second fixing portion is extended from a side of each side plate toward a middle direction of the recess.

4. The assembling structure of claim 1, wherein each first fixing portion is a protrusive bar, and each third fixing portion is an opening.

5. The assembling structure of claim 1, wherein each second fixing portion is a protrusive sheet.

6. The assembling structure of claim 1, wherein the first fixing portions and the second fixing portions are located on two inner edges of two sides of the recess.

7. The assembling structure of claim 1, wherein the bottom portion comprises multiple first positioning portions separately located between the second fixing portions on a side of the recess, each metal elastic sheet separately comprises a second positioning portions corresponding to each first fixing portions, and each second positioning portion is engaged with each first positioning portion.

8. The assembling structure of claim 7, wherein each first positioning portion is a protrusive block, and each second positioning portion is an engaging slot.

9. The assembling structure of claim 1, further comprising a blade penetrating between the pair of metal elastic sheets.

* * * * *